Feb. 28, 1928.  J. T. PAYETTE  1,660,885
LATH MILL
Filed July 26, 1926  3 Sheets-Sheet 3
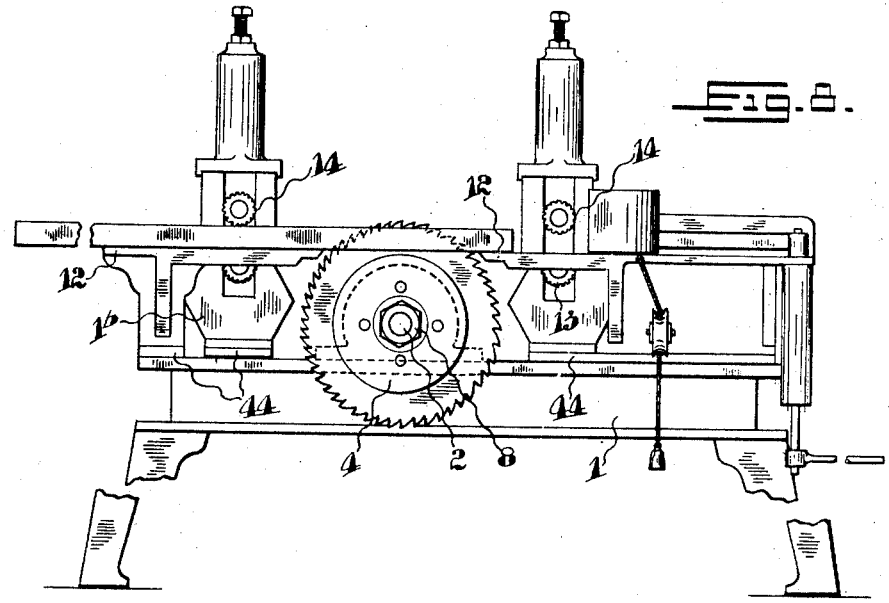
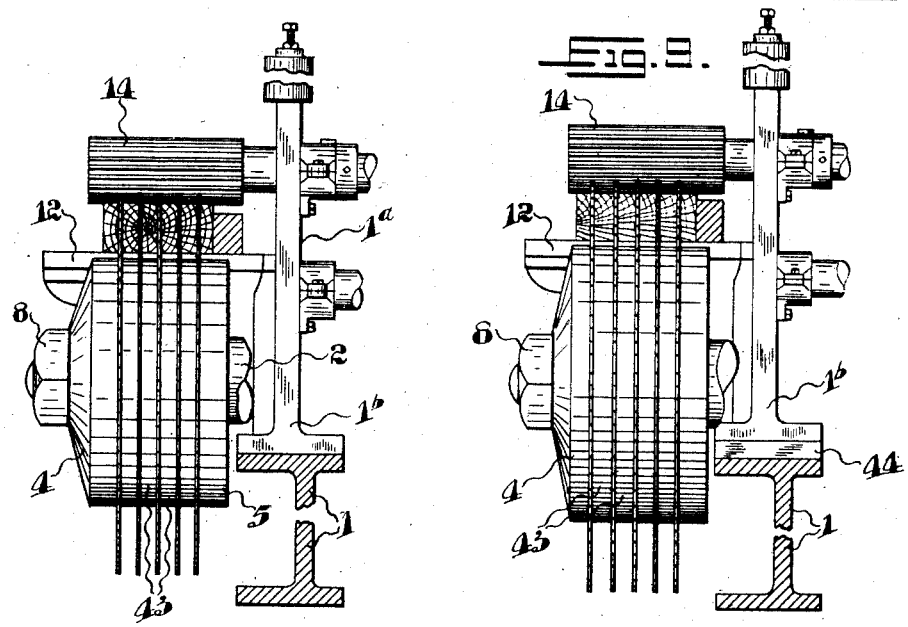
INVENTOR
J. T. Payette.
BY J. Edward Maybee
ATTY.

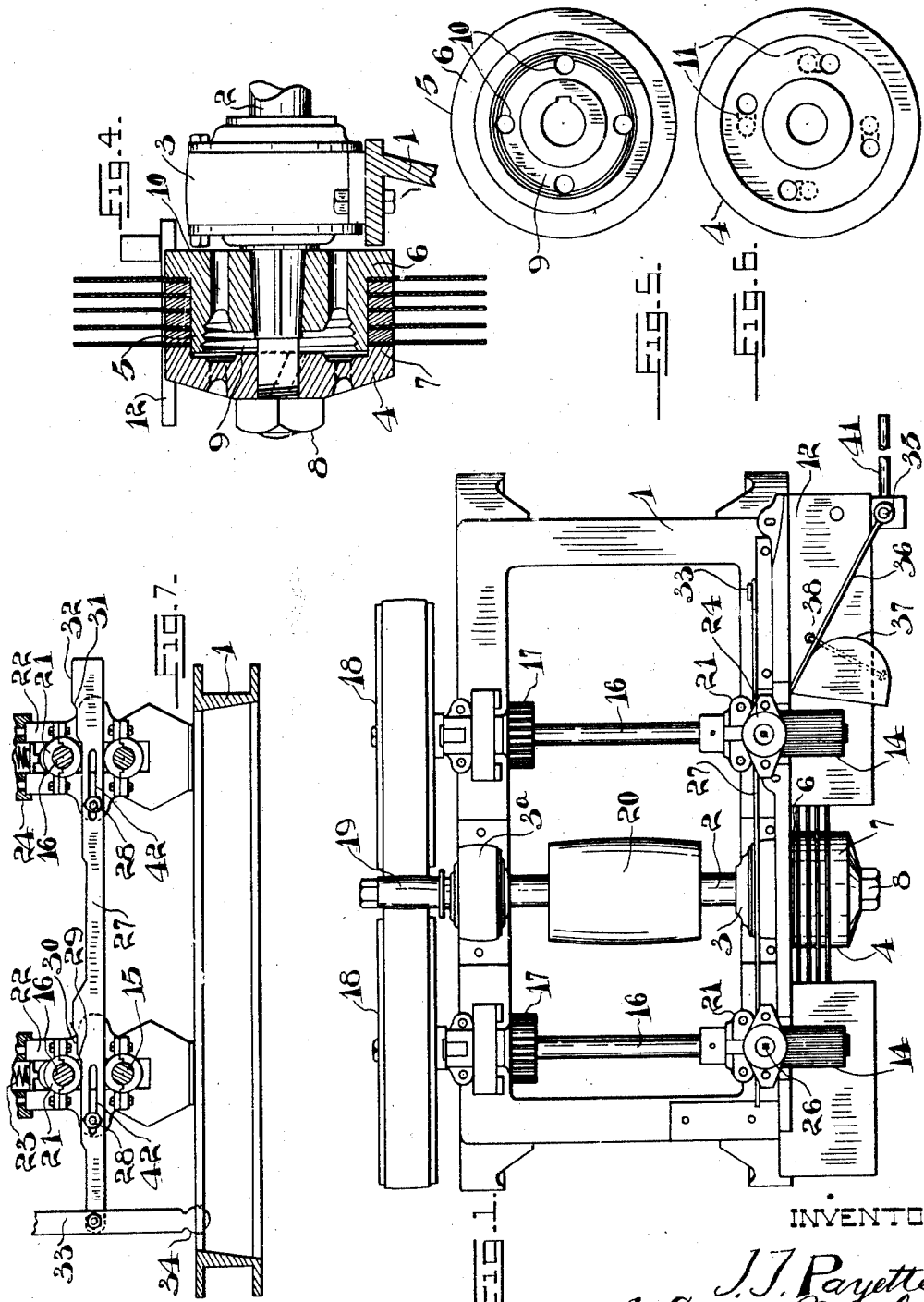

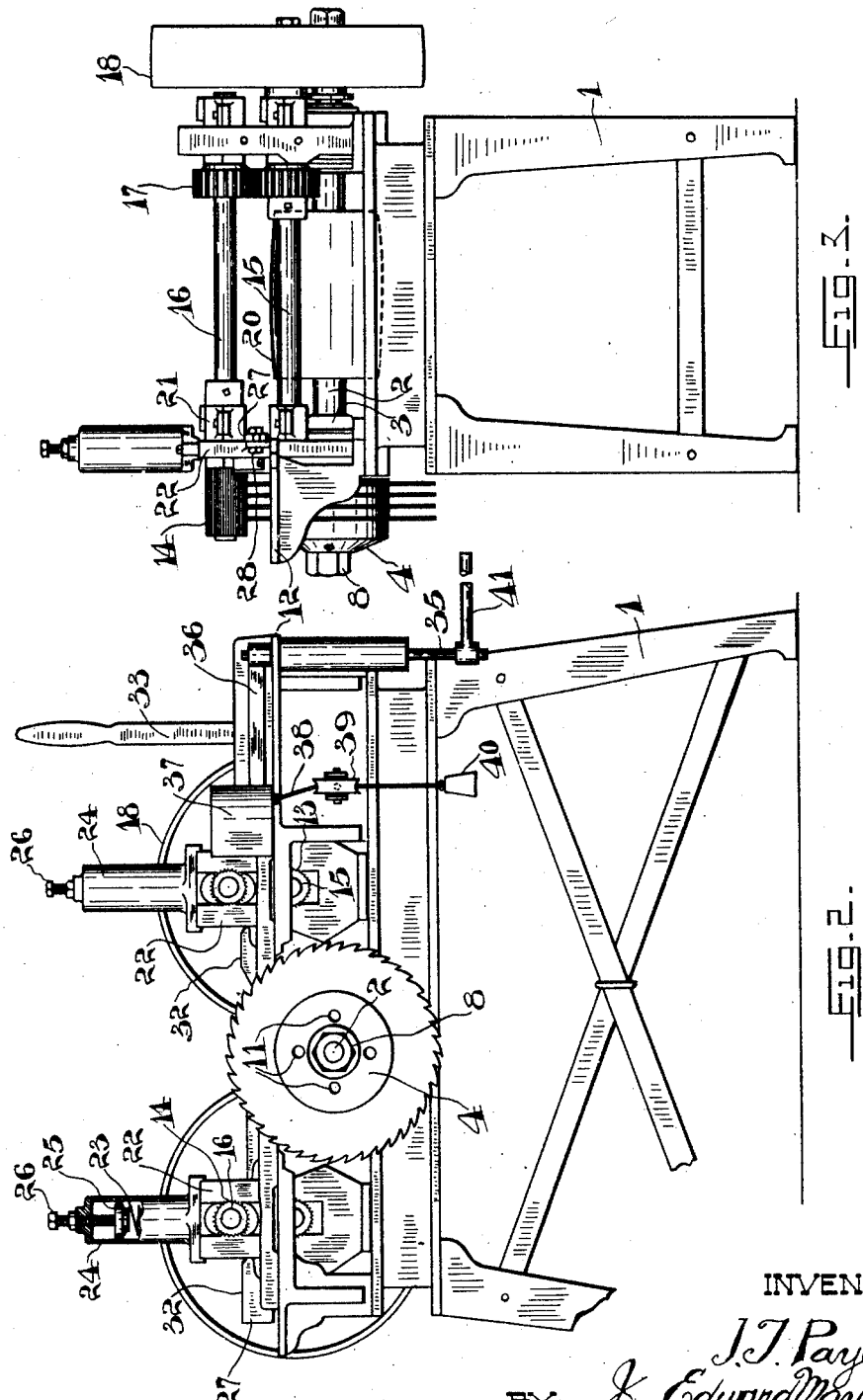

Patented Feb. 28, 1928.

1,660,885

UNITED STATES PATENT OFFICE.

JOHN T. PAYETTE, OF PENETANGUISHENE, ONTARIO, CANADA.

LATH MILL.

Application filed July 26, 1926. Serial No. 125,050.

This invention relates to lath mills including a gang of circular saws past which the stock is fed by rotary feed rolls.

As such mills are ordinarily constructed, saws of fairly heavy gauge must be employed, which results in considerable waste of material in saw dust. My object therefore is to devise a construction which will enable the gauge of the saws to be decreased with a consequent reduction in the width of the saw kerfs which decreases the waste and increases the amount of lath obtained from a given quantity of material. I attain this object by decreasing the gauge of the saws, by increasing the speed, by substituting ball bearings for plain bearings at the carrying end of the saw arbor and by providing means for cooling the saw carrying head and ball bearings. A further object is to provide a safety device to protect the operator from injury by stock thrown back by the saw. I attain this object by providing a guard behind the first feed rollers which is yieldingly held in position so that it will be pushed back as a piece of stock is pushed between the feed rolls sufficiently for the passage of the stock. A yet further object is to improve the details of construction of the feed mechanism as will hereinafter appear. The machine constructed as above is, however, subject to the disadvantage that the saws, being thin, require to be supported fairly close to their peripheries, and further the position of the saws relative to the work table must be fairly constant to obtain the best results. From this it results that the saws require to be renewed as soon as their diameter becomes materially reduced and while, as far as performance is concerned, they have considerable useful life left. A further object therefore is to devise means whereby the saws may be retained in use much longer than has so far been possible, thus materially reducing the cost of renewals.

I attain this object by providing for the saws two arbor heads, one of less diameter than the other, and by providing means whereby the position of the work table and feed rollers relative to the saw arbor may be changed. With new saws the larger arbor is employed. When the saws are worn down too far to do satisfactory work, the smaller arbor head is substituted and the distance between the saw arbor and the table reduced so that the saws project up through the table approximately as far as when new and first installed.

The invention is hereinafter more fully described and is illustrated in the accompanying drawings in which Fig. 1 is a plan view of my improved lath mill;

Fig. 2 a side elevation of the same;

Fig. 3 an end elevation of the same;

Fig. 4 a longitudinal section, on an enlarged scale, of the saw arbor head, part of the adjacent bearing being shown in elevation;

Figs. 5 and 6 respectively are elevations of the adjacent faces of the two parts of the head; and Fig. 7 a sectional detail showing the mechanism for raising the upper feed rollers;

Fig. 8 a side elevation showing spacers between the main and upper frame;

Fig. 9 a cross sectional detail showing parts of the mill with new saws in use; and Fig. 10 a similar view showing worn saws in use.

In the drawings like numerals of reference indicate corresponding parts in the different figures.

1 is the main frame of the machine suitably adapted to support the different parts and 1ª an upper frame separated from and secured to the main frame. On this main frame is journalled a saw arbor 2 by means of the bearings 3 and 3ª. At least the bearing 3, adjacent the arbor head, should be a ball or roller bearing, and preferably both bearings are of this type.

The arbor head, as shown more particularly in Figs. 6, 4 and 5, is formed of two parts or clamping members 4 and 5 which form between them a seat for the saws. The inner part 5 is of cylindrical form and is provided with a flange 6. The outer part 4 is recessed to fit over the outer end of the part 5, and is formed with a shoulder 7 opposite the flange 6. The saws are seated on the cylindrical portion of the inner part 5, and are clamped between the flange and the shoulder by means of a nut 8 threaded on the end of the arbor 2, suitable distance pieces 43 being located between the saws.

In the outer face of the part 5 is formed an annular chamber 9, with which communicate the passages 10 extending through the part to its inner face intermediate the arbor and the saw seat. Through the outer part 4 are formed a plurality of passages 11, which communicate with the annular chamber 9. The outer ends of these passages are inclined in the direction of rotation of the arbor to form air scoops whereby, as the arbor is rotated, air is drawn in and forced through the annular chamber 9 and through the passages 10. To facilitate the movement of the air I prefer to form the outer wall of the annular chamber 9 with a coarse thread or worm, which acts on the air in the manner of a screw propeller. Simple and convenient means are thus provided for dissipating the heat generated by the friction of the saws. A two-fold benefit results from this, for not only are the saws cooled but also overheating of the bearings, which is due in considerable measure to the heat of the saws being conducted through the arbor head and arbor to the bearings, is prevented. Not only by this arrangement is the conduction of heat to the bearings lessened but a direct cooling effect on the bearings is obtained, since the air passages 10 discharge directly against the side of the bearing and the flow of air is so rapid that, though it has a marked cooling effect on the head, its temperature, when it strikes the bearing, is sufficiently low for heat transference to take place between the bearing surfaces and the air. By the use of this method of air cooling, and by using a ball or roller bearing adjacent the arbor head, I am enabled to run the arbor at a sufficient speed to enable much thinner saws to be used than would otherwise be the case.

The stock is fed to the saws over a table 12 carried by the upper frame 1ª. Both in front of and behind the saws I locate pairs of feed rollers 13 and 14. The lower feed rollers 13 are carried by the shafts 15 and the upper feed rollers by the shafts 16. The shafts 15 and 16 of each pair are geared together by a gearing 17. To each of the shafts 15 is secured a pulley 18. The parts just described are all carried by the frame 1ª. On the saw arbor is secured a small pulley 19. A belt passing round the pulleys 18 and 19 provides means whereby the lower feed roller shafts 15 are driven from the saw arbor. A pulley 20 is secured to the saw arbor, forming means whereby it may be driven from line shafting. The upper feed rollers are provided with means whereby their pressure may be adjusted, and also with means whereby they may be raised out of action when required.

The bearing 21 of the upper feed roller shaft adjacent the feed roller is vertically slidable in a guide 22 and is engaged by the lower end of a coil spring 23 contained in a spring guide 24. The other end of the spring is engaged by a follower 25, the position of which may be adjusted by means of an adjusting screw 26. The pressure on the bearing of the upper feed roller is thus readily adjustable. The other bearings of the upper feed roller shafts may be of any known type adapted to permit of the necessary movement in a vertical plane of the upper feed rollers.

To raise the upper feed rollers out of action I provide the following mechanism. A lifting bar 27 is slidably supported on the guides 42, preferably by means of bolts 28 passing through slots in the lifting bar. This lifting bar is provided with inclined surfaces 29 terminating in dwells 30, these surfaces being adapted to engage parts of the bearings 21 of the upper feed roller shafts. By moving the lifting bar longitudinally, the upper feed rollers may be raised and held raised. A second pair of inclined surfaces 31 and dwells 32 is also provided whereby the feed rollers may be lifted and held at a higher elevation than necessary. The lifting bar is actuated by means of a hand lever 33 fulcrumed at 34 on the frame of the machine and pivotally connected intermediate its ends with the lifting bar.

The guard hereinbefore referred to is constructed and arranged as follows. A vertical shaft 35 is journalled adjacent the front of the table 12. To the upper end of this shaft, above the table, is secured an arm 36. To the end of this arm is secured a guard 37, which is cup shaped, the top and bottom, however, being preferably plane surface. This guard is adapted to swing close to the upper surface of the table 12 just in front of the first pair of feed rollers. A cord 38 is secured to the arm 36 and passes over a sheave 39 journalled on the frame of the machine. A weight 40 is secured to the end of the cord and serves to yieldingly maintain the guard in the position shown in Fig. 1. The guard is easily pushed back by the front end of a piece of stock when the operator feeds it forward along the table to the feed rollers. The guard is thus always held in position to catch any parts of the stock which may be split off or thrown backward during the operation of the machine, thus preventing injury to the operator. An arm 41 secured to the lower end of the shaft 35 provides means whereby the operator may himself move the guard when necessary.

In Fig. 8 of the drawings I show the machine as it appears when new saws are in position on the saw arbor. The new saws having been so installed, I locate pads or spacers 44 between the depending portions 1ᵇ of the upper frame 1ª and the top of the main frame. I also employ an arbor head of such a diameter that the saws are supported almost up to the level of the under side of the work on the table as shown in Fig. 9.

When the saws become so worn that they will not pass through the upper side of the work, they, together with the arbor head, are removed and are repositioned in a new head of lesser diameter as shown in Fig. 10, this new head being secured in position on an arbor in the ordinary manner by means of the nut 8. At the same time the pads 44 are removed and the depending parts 1<sup>b</sup> of the upper frame bolted directly to the main frame as shown in Fig. 10. The saws will now be found to project through the work to substantially the same distance as when new and will run as satisfactorily as at first until worn down too far to extend through the work.

From the constructions described it follows that at all times the saws are adequately supported close up to the under side of the work, while the available life of the saws is materially increased over and above that possible with the ordinary construction.

What I claim is:

1. In a sawing machine the combination of a saw arbor; and an arbor head having air passages extending therethrough from its outer to its inner end and adapted to carry a circular saw, said passages being shaped at their outer ends to form air scoops opening through the end of the head, parts of said passages having a worm formed therein to facilitate the movement of the air.

2. In a sawing machine an arbor head comprising a flanged member forming part of a saw seat and a removable washer or cap completing the seat, the said head having an annular chamber formed therein and passages extending from said chamber to its inner end, the cap having openings therethrough forming air inlets to said chamber, the said chamber having a worm formed therein to facilitate the movement of the air to and through the head.

3. In a sawing machine an arbor head comprising a flanged member forming part of a saw seat and a removable washer or cap completing the seat, the said flanged member having an annular chamber formed in its outer end and passages extending from said chamber to its inner end, the cap having openings therethrough forming air inlets to said chamber, said chamber having a worm formed therein to facilitate the movement of the air to and through the head, and the passages in the cap being inclined to form air scoops.

Signed at Penetanguishene, this 12th day of July, 1926.

JOHN T. PAYETTE.